United States Patent [19]
Brown et al.

[11] Patent Number: 4,552,811
[45] Date of Patent: Nov. 12, 1985

[54] CAPSULE MANUFACTURE

[75] Inventors: Robert W. Brown; Richard P. Bowman, both of Appleton, Wis.

[73] Assignee: Appleton Papers Inc., Appleton, Wis.

[21] Appl. No.: 619,967

[22] Filed: Jun. 12, 1984

Related U.S. Application Data

[63] Continuation-in-part of Ser. No. 517,296, Jul. 26, 1983, abandoned.

[51] Int. Cl.$^4$ ............................................. B01J 13/02
[52] U.S. Cl. ................................. 428/402.21; 264/4.7; 346/215; 428/914
[58] Field of Search ..................... 264/4.7; 428/402.21

[56] References Cited

U.S. PATENT DOCUMENTS

| | | | |
|---|---|---|---|
| 3,704,264 | 11/1972 | Gorman | 264/4.7 X |
| 4,105,823 | 8/1978 | Hasler et al. | 428/914 X |
| 4,221,710 | 9/1980 | Hoshi et al. | 264/4.7 X |
| 4,251,386 | 2/1981 | Saeki et al. | 428/914 X |
| 4,353,809 | 10/1982 | Hoshi et al. | 264/4.7 |
| 4,356,109 | 10/1982 | Saeki et al. | 428/914 X |

FOREIGN PATENT DOCUMENTS

| | | |
|---|---|---|
| 2832637 | 2/1979 | Fed. Rep. of Germany . |
| 3008658 | 9/1980 | Fed. Rep. of Germany . |
| 2416727 | 9/1979 | France . |
| 1246031 | 9/1971 | United Kingdom . |

*Primary Examiner*—Richard D. Lovering
*Attorney, Agent, or Firm*—E. Frank McKinney; Paul S. Phillips, Jr.

[57] ABSTRACT

A process is disclosed for performing encapsulation, en masse, by an in situ polymerization reaction to yield capsule wall material. The reaction comprises the polymerization of urea and formaldehyde, or monomeric or low molecular weight polymers of dimethylol urea or methylated dimethylol urea, melamine and formaldehyde, monomeric or low molecular weight polymers of methylol melamine or methylated methylol melamine, in an aqueous vehicle and the reaction is conducted in the presence of certain acrylic acid copolymers. The disclosed encapsulation process provides improved resistance of the emulsion of intended capsule core material to destabilization and permits the manufacture of microcapsules with improved drop size distribution, improved resistance to frictional smudge damage and enhanced impermeability.

14 Claims, No Drawings

CAPSULE MANUFACTURE

This appliction is a continuation-in-part of copending application Ser. No. 517,296, filed on July 26, 1983, now abandoned.

This invention relates to a process for manufacturing minute capsules, en masse, in a liquid manufacturing vehicle. The process of the invention involves liquid-liquid phase separation of a relatively concentrated solution of polymeric material to be used in the formation of walls for the minute capsules. More particularly, the process of this invention involves the polymerization of urea and formaldehyde, monomeric or low molecular weight polymers of dimethylol urea or methylated dimethylol urea, melamine and formaldehyde, monomeric or low molecular weight polymers of methylol melamine or methylated methylol melamine, in an aqueous vehicle and the reaction is conducted in the presence of certain acrylic acid-alkyl acrylate copolymers.

A method of encapsulation by in situ polymerization, including a reaction between urea and formaldehyde or polycondensation of monomeric or low molecular weight polymers of dimethylol urea or methylated dimethylol urea in an aqueous vehicle conducted in the presence of negatively-charged, carboxyl-substituted, linear aliphatic hydrocarbon polyelectrolyte material dissolved in the vehicle, is disclosed in U.S. Pat. Nos. 4,001,140; 4,087,376; and 4,089,802.

A method of encapsulating by in situ polymerization, including a reaction between melamine and formaldehyde or polycondensation of monomeric or low molecular weight polymers of methylol melamine or etherified methylol melamine in an aqueous vehicle conducted in the presence of negatively-charged, carboxyl-substituted linear aliphatic hydrocarbon polyelectrolyte material dissolved in the vehicle, is disclosed in U.S. Pat. No. 4,100,103.

A method of encapsulating by polymerizing urea and formaldehyde in the presence of gum arabic is disclosed in U.S. Pat. No. 4,221,710. This patent further discloses that anionic high molecular weight electrolytes can also be employed with the gum arabic. Examples of the anionic high molecular weight electrolytes include acrylic acid copolymers and under specific examples of acrylic acid copolymers are listed copolymers of alkyl acrylates and acrylic acid including methyl acrylate-acrylic acid, ethyl acrylate-acrylic acid, butyl acrylate-acrylic acid and octyl acrylate-acrylic acid copolymers.

A method for preparing microcapsules by polymerizing urea and formaldehyde in the presence of an anionic polyelectrolyte and an ammonium salt of an acid is disclosed in U.S. Pat. Nos. 4,251,386 and 4,356,109. Examples of the anionic polyelectrolytes include copolymers of acrylic acid and under specific examples of acrylic acid copolymers are listed copolymers of alkyl acrylates and acrylic acid including methyl acrylate-acrylic acid, ethyl acrylate-acrylic acid, butyl acrylate-acrylic acid and octyl acrylate-acrylic acid copolymers.

This is no reference made in any of the above cited U.S. Pat. Nos. 4,221,710; 4,251,386; or 4,356,109 regarding the use of propyl acrylate-acrylic acid, amyl acrylate-acrylic acid, hexyl acrylate-acrylic acid, cyclohexylacrylate-acrylic acid or 2-ethylhexylacrylate-acrylic acid copolymers and no meaningful proportion in said references of any alkyl acrylate in any copolymer including the proportion of ethyl acrylate in the disclosed ethyl acrylate-acrylic acid copolymers or of butyl acrylate in the disclosed butyl acrylate-acrylic acid copolymers and further there is no awareness of nor appreciation for the criticality of a certain range of the percentage of alkyl acrylate in certain of the copolymers when such copolymers are subsequently used as system modifier material in encapsulation processes.

The most widespread use of microcapsules to date has been in certain kinds of pressure-sensitive copying systems. In one such system, disclosed in U.S. Pat. No. 2,730,456 and commonly known as manifold record material, an upper sheet is coated on its lower surface with microcapsules containing a solution of a colorless chromogenic material (hereinafter referred to as a coated back or CB sheet), and a lower sheet is coated on its upper surface with a color developing coreactant material, e.g. an acidic clay, a phenolic resin or certain organic salts (hereinafter referred to as a coated front or CF sheet). For applications which require more than two plies in the record material, a number of intermediate sheets are also provided, each of which is coated on its lower surface with microcapsules and on its upper surface with acidic, color-developing material. Pressure exerted on the sheets by writing or typing ruptures the microcapsules, thereby releasing the chromogenic material solution on to the coreactant material on the next lower sheet and giving rise to a chemical reaction which develops the color of the chromogenic material.

In another system, known as a self-contained system and disclosed in U.S. Pat. Nos. 2,730,457 and 4,197,346, microcapsules containing a chromogenic material solution and a coreactant material are coated on the same surface of a sheet of paper. Pressure exerted on the sheet by writing or typing causes the capsules to rupture and release the chromogenic material, which then reacts with the coreactant material on the sheet to produce a color.

Microcapsules for use in the above-described pressure-sensitive copying systems have a series of stringent property requirements so as to produce an optimum copying system. Some of these properties are capsule strength, size distribution range and wall integrity (impermeability).

The processes according to U.S. Pat. Nos. 4,001,140; 4,087,376; 4,089,802; and 4,100,103 have been successfully used to encapsulate solutions of chromogenic materials for use in pressure-sensitive copying papers. Of the eligible carboxyl group system modifiers disclosed in said patents, the hydrolyzed maleic anhydride copolymers are preferred. Among the hydrolyzed maleic anhydride copolymers disclosed, the most preferred is poly(ethylene-co-maleic anhydride) (hereinafter referred to as EMA) because of the balance of properties provided to the encapsulation processes.

The cost of EMA, relative to other eligible system modifiers, has always been a premium, producing a consequent premium in the cost of the microcapsules manufactured by processes in which EMA constitutes the system modifier. Because of cost and availability considerations, poly(acrylic acid) (hereinafter referred to as PAA), is a logical substitute for EMA as the system modifier. While microcapsules made from processes according to U.S. Pat. Nos. 4,001,140; 4,087,376; 4,089,802; and 4,100,103, in which PAA constitutes the system modifier, are of commercial quality for use in pressure-sensitive copying paper, they do not possess the optimum balance of properties obtained when EMA is utilized.

One function of the system modifier in said patents is to take an active part in the control or moderation of the polymerization reaction of the starting materials used to form the condensation polymer which makes up the resulting capsule walls.

Another function of the system modifier in said patents is to act as an emulsifying agent to promote and maintain the separation of the individual droplets of the intended capsule core material in the aqueous manufacturing vehicle.

When PAA is utilized as the system modifier, emulsification of the intended capsule core material requires more energy input and time and produces a poorer drop size distribution than when EMA is employed. The poorer emulsifying capability of PAA can be offset in the case of the process of U.S. Pat. No. 4,100,103 by mixing in, prior to emulsification, the starting materials (e.g. methylated methylol melamine) employed in the in situ polymerization reaction to form the condensation polymer which makes up the resulting capsule walls. The presence of methylated methylol melamine or a low molecular weight polymer thereof, (hereinafter referred to as MMM) during the intended core material emulsification step, can result in the premature polymerization of the MMM. This tendency of the MMM to prematurely react under these circumstances is reduced by raising the pH of the PAA-MMM solution to the highest level at which emulsification of the intended core material can be obtained. Once a satisfactory intended core material emulsion is obtained, the pH of the emulsion must be reduced in order to obtain the deposition of satisfactory capsule walls in a reasonable amount of time. This process has been further improved by the addition of certain salts as disclosed in U.S. Pat. No. 4,444,699 of Donald E. Hayford. Also, the use of PAA as the system modifier in combination with polystyrene sulfonic acid or a salt thereof in which the polystyrene sulfonic acid is present in a certain range of relative amount has been disclosed in copending application Ser. No. 460,704 of the present inventors.

It has now been learned that, when the processes of U.S. Pat. Nos. 4,001,140; 4,087,376; 4,089,802; and 4,100,103 are practiced using certain acrylic acid-alkyl acrylate copolymers, unexpected benefits are produced over the teachings of the prior art. Improved emulsification of intended capsule core material, substantially enhanced resistance of said emulsion to destabilization during the course of subsequent encapsulation processes, enhanced resistance to frictional smudge damage and enhanced impermeability of the resulting microcapsules are included among said benefits when compared to the results obtained from the use of PAA or a non-preferred copolymer.

It is, therefore, an object of the present invention to provide a capsule manufacturing process wherein emulsion of intended capsule core material of improved drop size distribution is produced.

It is another object of the present invention to provide a capsule manufacturing process wherein the emulsion of intended capsule core material possesses improved resistance to destabilization during the course of an encapsulation process.

It is yet another object of the present invention to provide a capsule manufacturing process wherein the resulting microcapsules possess an improved resistance to frictional smudge damage.

It is still another object of the present invention to provide a capsule manufacturing process wherein the resulting microcapsules possess an improved impermeability.

It is a specific object of this invention to provide an encapsulation process wherein the capsule wall material comprises a urea-formaldehyde polymeric material or a melamine-formaldehyde polymeric material generated by an in situ polymerization reaction in the presence of certain acrylic acid-alkyl acrylate copolymers dissolved in the manufacturing vehicle.

These and other objects and advantages of the present invention will become more apparent to those skilled in the art from a consideration of the following specification and claims.

The starting materials used to form the condensation polymer which makes up the resulting capsule walls and the procedures described in U.S. Pat. Nos. 4,001,140; 4,087,376; 4,089,802; and 4,100,103, which are hereby incorporated by reference, are eligible for use in the present invention. In addition to the materials and procedures described in the above-referenced patents, the process of the present invention involves the use of certain acrylic acid-alkyl acrylate copolymers as the system modifier. Exemplary of these novel system modifiers are the copolymers of acrylic acid and ethyl acrylate, propyl acrylate, butyl acrylate, amyl acrylate, hexyl acrylate, cyclohexyl acrylate and 2-ethylhexyl acrylate, respectively. Also exemplary of these system modifiers are copolymers of acrylic acid and mixtures of alkyl acrylates. More specifically, the copolymers of acrylic acid and the above-identified alkyl acrylates which produce the aforementioned unexpected beneficial properties are those copolymers in which the proportion of alkyl acrylate in the copolymer represents the weight percent of the copolymer listed in Table 1.

In order to determine the preferred amount of alkyl acrylate in the copolymers, one or more of the following selection methods was employed:
  (1) Ability to prepare an emulsion of intended capsule core material of acceptable drop size distribution;
  (2) Resistance of said emulsion to destabilization during addition of the starting materials for capsule wall formation;
  (3) Resistance of said emulsion to destabilization during the course of the encapsulation process; or
  (4) Impermeability of the resulting microcapsules.

TABLE 1

| Alkyl Acrylate | Weight Percent of Alkyl Acrylate in Copolymer |
| --- | --- |
| ethyl acrylate | about 12 to about 30 |
| propyl acrylate | about 6 to about 14 |
| butyl acrylate | about 4 to about 20 |
| amyl acrylate | about 2 to about 14 |
| hexyl acrylate | about 2 to about 10 |
| cyclohexyl acrylate | about 4 to about 12 |
| 2-ethylhexyl acrylate | about 2 |

The process is operable over a wide range of temperatures but a temperature range of about 40° C. to about 95° C. is preferred. More preferred is the temperature range of about 50° C. to about 70°.

Under certain circumstances the inclusion of one of the salts disclosed in U.S. Pat. No. 4,444,699 of Donald E. Hayford provides a further improvement in the viscosity of the resulting microcapsule slurry. However, the use of such salts is not required to practice and demonstrate the beneficial properties of the claimed invention.

The following examples are given merely as illustrative of the present invention and are not to be considered as limiting. All parts and percentages throughout the application are by weight, unless specified otherwise. All solutions, unless otherwise designated, are aqueous solutions.

The intended capsule core material for all of the examples to follow was a solution of chromogenic compounds as listed in Table 2.

TABLE 2

| Concentration | Chromogenic Material |
| --- | --- |
| 1.7% | 3,3-bis(p-dimethylaminophenyl)-6-dimethylaminophthalide |
| 0.55% | 2'-anilino-3'-methyl-6'-diethylaminofluoran |
| 0.55% | 3,3-bis(1-ethyl-2-methylindol-3-yl)phthalide |

The solvent for the preceding chromogenic compound solution was a mixture of 65 parts of a $C_{10}$–$C_{13}$ alkylbenzene and 35 parts of benzylated xylenes (U.S. Pat. No. 4,130,299).

EXAMPLES 1–51

In each of Examples 1–51, the following general procedure was used. Into 153 grams of a mixture of 149.5 grams of water and 3.5 grams of the alkyl acrylate-acrylic acid copolymer, adjusted to pH 5.0, were emulsified 180 grams of the intended capsule core material solution of Table 2. A second mixture of 6.5 grams of the corresponding copolymer and 65.0 grams of water was prepared and adjusted to pH 5.0 and 20 grams of a partially methylated methylol melamine resin solution ("Resimene 714", 80% solids, Monsanto Company, St. Louis, Mo.) was added and this mixture was in turn added with stirring to the above-described emulsion. The resulting mixture was placed in a container which was mounted in a room temperature water bath, continuous stirring was provided and the bath was heated to 55° C. and maintained at this temperature overnight to initiate and complete encapsulation.

When ethyl acrylate-acrylic acid was the copolymer, the pH of the second mixture was adjusted to 4.0 rather than 5.0. When propyl acrylate-acrylic acid, amyl acrylate-acrylic acid, cyclohexyl acrylate-acrylic acid and 2-ethylhexyl acrylate-acrylic acid were the copolymers, all ingredients were utilized at half the quantities specified in the general procedure and the water bath was heated to a temperature of 65° C. rather than 55° C.

For each of the above Examples, the particle size was measured after emulsification, after addition of the mixture of the Resimene and additional copolymer and after completion of the encapsulation process. The particle size measurements were made both in a Microtrac Particle Size Analyzer (manufactured by Leeds and Northrup Instruments, St. Petersburg, Fla.), and visually by means of a microscope. Both means were employed because, even though the Particle Size Analyzer is very good at providing reliable particle size data for small sizes, it can fail to detect very large droplets which can be easily detected by means of a microscope.

A CF drawn-down test, similar to that in U.S. Pat. No. 4,100,103, was employed to follow the course of the wall formation and to detect the presence of over-sized capsules. In the present Examples, the encapsulation emulsion containing all of the capsule-forming ingredients was coated onto a reactive CF sheet utilizing a gap-type applicator set at 75 microns wet film thickness. In this test, a color is formed by the reaction of the chromogenic material with the coreactant material of the CF sheet. Capsule wall formation is demonstrated by the mitigation of the color when the emulsion is coated at a later time and is measured by an opacimeter to give the reflectance of the coated area. This same test provides a means of detecting over-sized capsules which appear as blue specks, visible to the naked eye, upon drying of the emulsion.

Listed in Table 3 are Examples 1–51 and the corresponding type of acrylic acid-alkyl acrylate copolymer and weight percent of the respective alkyl acrylate in the copolymer.

TABLE 3

| | Alkyl Group in Copolymer | | | | | | |
| --- | --- | --- | --- | --- | --- | --- | --- |
| | Ethyl | Propyl | Butyl | Amyl | Hexyl | Cyclohexyl | 2-Ethylhexyl |
| Example | Ex. 1, 10% | Ex. 10, 5% | Ex. 17, 2% | Ex. 27, 1% | Ex. 36, 1% | Ex. 43, 2% | Ex. 49, 1% |
| Number | Ex. 2, 12% | Ex. 11, 6% | Ex. 18, 4% | Ex. 28, 2% | Ex. 37, 2% | Ex. 44, 4% | Ex. 50, 2% |
| and | Ex. 3, 14% | Ex. 12, 8% | Ex. 19, 6% | Ex. 29, 4% | Ex. 38, 4% | Ex. 45, 6% | Ex. 51, 3% |
| Corresponding | Ex. 4, 18% | Ex. 13, 10% | Ex. 20, 8% | Ex. 30, 6% | Ex. 39, 6% | Ex. 46, 8% | |
| Weight | Ex. 5, 22% | Ex. 14, 12% | Ex. 21, 10% | Ex. 31, 8% | Ex. 40, 8% | Ex. 47, 12% | |
| Percent | Ex. 6, 24% | Ex. 15, 14% | Ex. 22, 12% | Ex. 32, 10% | Ex. 41, 10% | Ex. 48, 16% | |
| Alkyl | Ex. 7, 26% | Ex. 16, 16% | Ex. 23, 14% | Ex. 33, 12% | Ex. 42, 12% | | |
| Group | Ex. 8, 30% | | Ex. 24, 16% | Ex. 34, 14% | | | |
| In | Ex. 9, 35% | | Ex. 25, 20% | Ex. 35, 18% | | | |
| Copolymer | | | Ex. 26, 24% | | | | |

The above procedure was substantially used for all Examples employing the polymerization of methylated methylol melamine resin as the capsule wall forming process with the following exceptions:

In Table 4 are listed the performance results of Examples 1–51 as determined by the previously-described particle size measurements and CF draw-down test. From these results, the critical range for each copolymer can be determined.

TABLE 4

| | Percent by Weight of Alkyl Acrylate in Copolymer | | | | | | | | | | | | | | | | | | | | | | |
| --- | --- | --- | --- | --- | --- | --- | --- | --- | --- | --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 | 14 | 15 | 16 | 18 | 20 | 22 | 24 | 26 | 28 | 30 | 32 | 35 |
| Ethyl Acrylate | | | | | | | | | | # | | + | | + | | | + | | + | + | + | | + | | 0 |
| Propyl Acrylate | | | | | + | + | + | + | + | + | | \| | | | | | | | | | | | | | |
| Butyl Acrylate | | * | + | + | + | + | + | + | | + | | + | | + | | + | + | 0 | | | | | | | |
| Amyl Acrylate | \| | + | + | + | + | + | + | + | | + | | * | | | | | | | | | | | | | |
| Hexyl Acrylate | * | + | + | + | + | + | + | * | | | | | | | | | | | | | | | | | |
| Cyclohexyl Acrylate | | * | + | + | + | | + | | | * | | | | | | | | | | | | | | | |

TABLE 4-continued

| | Percent by Weight of Alkyl Acrylate in Copolymer | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 18 | 20 | 22 | 24 | 26 | 28 | 30 | 32 | 35 |
| 2-Ethylhexyl Acrylate | | * | + | * | | | | | | | | | | | | | | | | | | | | | |

Key:
0 - Unacceptable emulsion.
| - Acceptable emulsion, but unacceptable size change when Resimene solution added.
* - Acceptable emulsion, but unacceptable size change during encapsulation.
\# - Acceptable emulsion, but unacceptable encapsulation due to poor wall formation.
\+ - Acceptable emulsion and acceptable encapsulation.

Certain of Examples 1–51 were individually mixed with ethoxylated corn starch binder and uncooked wheat starch granules according to the dry proportions listed below and sufficient water was added to make a 20% solids dispersion.

| Parts, Dry | Material |
|---|---|
| 50 | capsules |
| 5 | ethoxylated corn starch |
| 12.5 | wheat starch granules |

The dispersion was coated on a 50 grams per square meter paper base with a No. 12 wire-wound coating rod and dried. The resulting CB sheets were each tested in a Typewriter Intensity (TI) test ad Oven Decline test as described below.

For the TI test, a CF sheet bearing a coating comprising an oil-soluble metal salt of a phenol-formaldehyde novolak resin, made by procedures described in U.S. Pat. Nos. 3,732,120, and 3,455,721, was employed. In the TI test a standard pattern is typed on a coated side-to-coated side CB-CF pair. After the image develops twenty minutes, the intensity is measured by a reflectance method. The reflectance of the typed area is a measure of color development on the CF sheet and is reported as the ratio of the reflectance of the typed area to that of the background reflectance of the CF paper (I/Io), expressed as a percentage. A high value indicates little color development and a low value indicates good color developement.

A related test concerning capsule quality is the degree of loss of ability of capsule-coated paper to produce transfer prints in a typewriter test after storage of the coated paper in an oven at a specified temperature for a specified time (Oven Decline Test). It is useful to perform a TI test with a CB/CF couplet, placing the CB in a 100° C. oven for 16 hours and then reimaging the couplet after storage. This test has consistently shown that poor capsules will lose most or all of their ability to make a transfer print during such oven storage and that good capsules will withstand this storage with little or no loss in ability to give a print.

As evidenced by the data in Table 5, all of the CB sheets tested demonstrate good capsule quality through the retention of the ability of the CB sheets to produce a good TI image intensity after oven storage.

TABLE 5

| Ex. No. | Alkyl Group of Copolymer | | Typewriter Intensity | |
|---|---|---|---|---|
| | Weight Percent | Type | Before Oven Storage | After Oven Storage |
| 3 | 14 | Ethyl | 53 | 55 |
| 6 | 24 | Ethyl | 53 | 54 |
| 11 | 6 | Propyl | 53 | 55 |
| 12 | 8 | Propyl | 55 | 57 |
| 13 | 10 | Propyl | 53 | 55 |
| 14 | 12 | Propyl | 54 | 56 |
| 15 | 14 | Propyl | 54 | 55 |
| 19 | 6 | Butyl | 51 | 56 |
| 20 | 8 | Butyl | 46 | 50 |
| 21 | 10 | Butyl | 52 | 55 |
| 22 | 12 | Butyl | 50 | 54 |
| 28 | 2 | Amyl | 53 | 55 |
| 29 | 4 | Amyl | 56 | 58 |
| 30 | 6 | Amyl | 57 | 59 |
| 31 | 8 | Amyl | 55 | 58 |
| 32 | 10 | Amyl | 54 | 56 |
| 33 | 12 | Amyl | 60 | 64 |
| 34 | 14 | Amyl | 53 | 56 |
| 37 | 2 | Hexyl | 56 | 59 |
| 38 | 4 | Hexyl | 55 | 58 |
| 39 | 6 | Hexyl | 55 | 56 |
| 40 | 8 | Hexyl | 55 | 58 |
| 41 | 10 | Hexyl | 56 | 59 |
| 44 | 4 | Cyclohexyl | 54 | 56 |
| 45 | 6 | Cyclohexyl | 54 | 56 |
| 46 | 8 | Cyclohexyl | 53 | 57 |
| 50 | 2 | 2-Ethylhexyl | 53 | 56 |

In Examples 52–57, a series of encapsulation experiments, similar to Examples 1–51, was performed except that a different capsule wall formation process was utilized. In each of Examples 52–57, the following general procedure was used. Into a mixture of 89.5 grams of water, 5 grams of urea, 0.5 gram of resorcinol and 5 grams of an alkyl acrylate-acrylic acid copolymer, adjusted to pH 4.0, were emulsified 90 grams of the intended capsule core material solution of Table 2. These mixtures were emulsified and the resulting mixture was placed in a container which was mounted in a room temperature water bath, continuous stirring was provided, 13.5 grams of 37% formaldehyde solution were added and the bath was heated to 55° C. and maintained at that temperature overnight to initiate and complete encapsulation.

The resulting capsule batches, which were all found to be successful for particle size determination tests, were formulated into CB sheets as previously described (supra) and these CB sheets were utilized in Typewriter Intensity and Oven Decline tests as previously described (supra). The results of the TI and Oven Decline tests are entered in Table 6.

TABLE 6

| Ex. No. | Alkyl Group of Copolymer | | Typewriter Intensity | |
|---|---|---|---|---|
| | Weight Percent | Type | Before Oven Storage | After Oven Storage |
| 52 | 18 | Ethyl | 56 | 56 |
| 53 | 8 | Propyl | 59 | 59 |
| 54 | 6 | Amyl | 57 | 57 |
| 55 | 8 | Hexyl | 54 | 54 |
| 56 | 4 | Cyclohexyl | 56 | 56 |

TABLE 6-continued

| Ex. No. | Alkyl Group of Copolymer | | Typewriter Intensity | |
|---|---|---|---|---|
| | Weight Percent | Type | Before Oven Storage | After Oven Storage |
| 57 | 2 | 2-Ethylhexyl | 55 | 56 |

The results of the Typewriter Intensity and Oven Storage tests provide further evidence of the efficacy of various alkyl acrylate-acrylic acid copolymers when employed in a process for preparing microcapsules wherein the polymeric shells are produced by in situ polymerization of urea and formaldehyde.

The invention being thus described, it will be obvious that the same may be varied in many ways. Such variations are not to be regarded as a departure from the spirit and scope of the invention and all such modifications are intended to be included within the scope of the following claims.

What is claimed is:

1. A process for preparing microcapsules in an aqueous manufacturing vehicle which comprises enwrapping particles of intended capsule core material, substantially insoluble in said vehicle, with polymeric shells produced by in situ polymerization of melamine and formaldehyde, methylol melamine, methylated methylol melamine, urea and formaldehyde, dimethylol urea or methylated dimethylol urea in the presence of an acrylic acid-alkyl acrylate copolymer, wherein the weight percent and type of alkyl acrylate in said copolymer are selected from the group consisting of about 12 to about 30 ethyl acrylate, about 6 to about 14 propyl acrylate, about 4 to about 20 butyl acrylate, about 2 to about 14 amyl acrylate, about 2 to about 10 hexyl acrylate, about 4 to about 12 cyclohexyl acrylate and about 2 2-ethylhexyl acrylate and said copolymer is present as about 0.4 to about 15 percent by weight of said manufacturing vehicle.

2. The process of claim 1 wherein the polymeric shell is produced by in situ polymerization of methylated methylol melamine or urea and formaldehyde.

3. The process of claim 1 wherein the polymeric shell is produced by in situ polymerization of methylated methylol melamine.

4. The process of claims 1, 2 or 3, wherein the polymerization is conducted at a temperature of about 40° C. to about 95° C.

5. The process of claim 4 wherein the polymerization is conducted at a temperature of about 50° C. to about 70° C.

6. The process of claim 5 wherein said copolymer consists of about 6 to about 10 weight percent butyl acrylate.

7. The process of claim 6 wherein said copolymer consists of about 8 weight percent butyl acrylate.

8. The process of claim 5 wherein said copolymer consists of about 18 to about 24 weight percent ethyl acrylate.

9. The process of claim 8 wherein said copolymer consists of about 22 weight percent ethyl acrylate.

10. The process of claim 5 wherein said copolymer consists of about 2 to about 6 weight percent hexyl acrylate.

11. The process of claim 10 wherein said copolymer consists of about 4 weight percent hexyl acrylate.

12. The process of claim 5 wherein said copolymer consists of about 4 to about 6 weight percent cyclohexyl acrylate.

13. The process of claim 12 wherein said copolymer consists of about 4 weight percent cyclohexyl acrylate.

14. Microcapsules produced by a process as claimed in claim 1.

* * * * *

UNITED STATES PATENT AND TRADEMARK OFFICE
CERTIFICATE OF CORRECTION

PATENT NO. : 4,552,811

DATED : November 12, 1985

INVENTOR(S) : Robert W. Brown et al.

It is certified that error appears in the above-identified patent and that said Letters Patent is hereby corrected as shown below:

Column 1, line 60, change "This" to --There--.

Signed and Sealed this

Twenty-eighth Day of January 1986

[SEAL]

Attest:

DONALD J. QUIGG

Attesting Officer

Commissioner of Patents and Trademarks